UNITED STATES PATENT OFFICE.

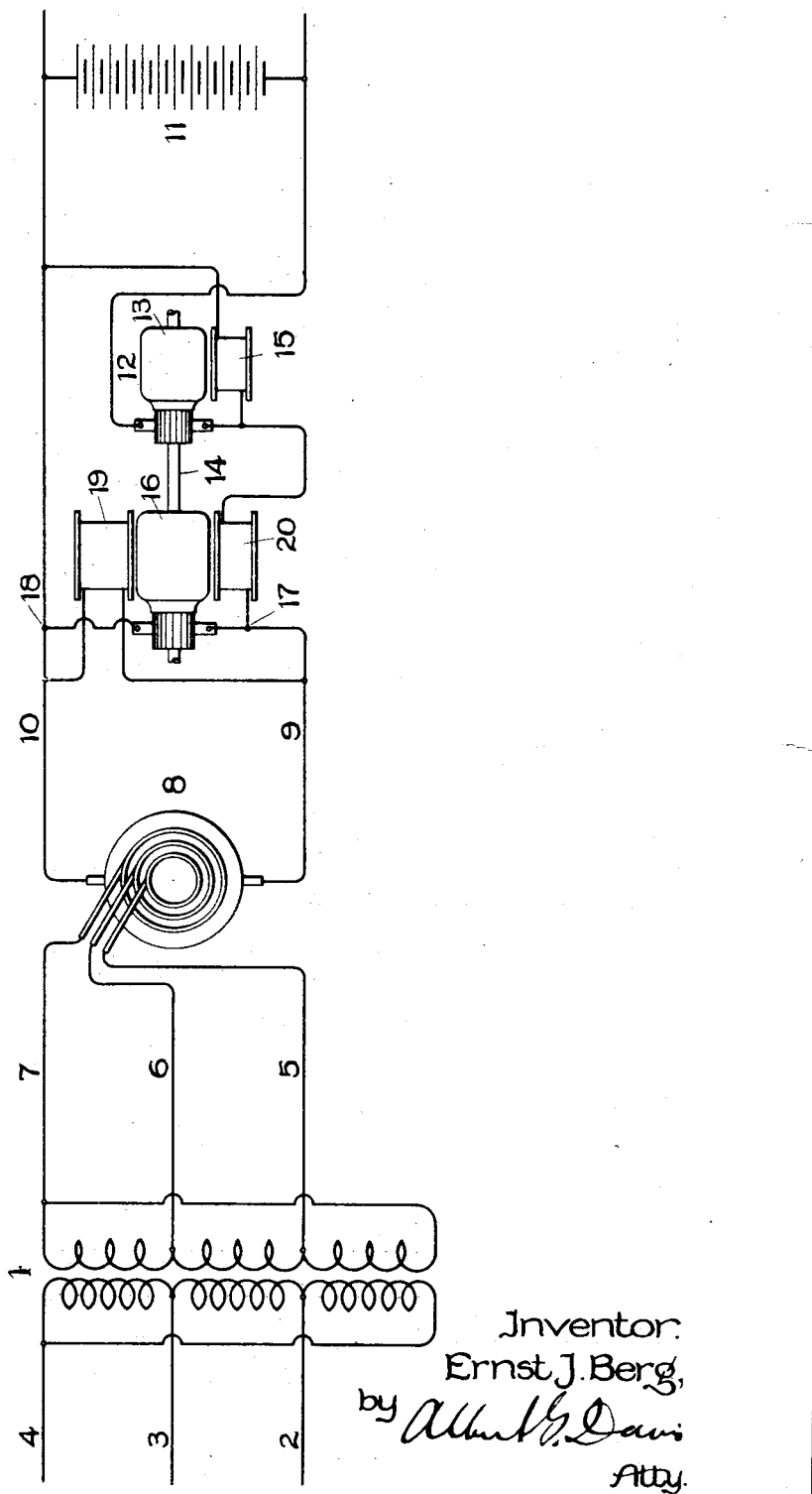

ERNST J. BERG, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 832,357.  Specification of Letters Patent.  Patented Oct. 2, 1906.

Application filed April 25, 1900. Serial No. 14,215.

*To all whom it may concern:*

Be it known that I, ERNST J. BERG, a citizen of the United States, residing at Schenectady, county of Schenectady, State of New York, have invented certain new and useful Improvements in Systems of Electrical Distribution, of which the following is a specification.

My present invention relates to a system of electrical distribution and comprises certain means for regulating the voltage of supply-mains in response to variations of load. The specific means which I employ for this purpose consists of a dynamo-electric machine or booster with its armature in series with the circuit to be regulated and driven at a speed variable in response to variation of load.

My invention will best be understood by reference to the following description, taken in connection with the accompanying drawing, while its scope will be particularly pointed out in the claims appended hereto.

The drawing represents a distributing system in which alternating current is first converted into direct current and then utilized in a consumption-circuit.

At 1 I have indicated a three-phase step-down transformer supplied with energy over transmission-lines 2 3 4 and with its secondary connected, through leads 5 6 7, to a rotary converter, (indicated at 8.) The direct-current terminals of the rotary converter are connected to mains 9 10, by which direct current is supplied to a consumption-circuit, here represented in part by the storage battery 11. It is to be understood, however, that the current may be supplied to any other suitable translating devices.

To secure the desired regulation, I make use of two mechanically-connected dynamo-electric machines, one of which operates as a booster and the other as a motor. This booster or regulating-generator I prefer to refer to hereinafter by the term "generator" rather than booster, for the reason that it may be so connected either to add its voltage to that of the system or to oppose the voltage. The generator is indicated at 12 and is connected with its armature 13 in series with the main 9, leading to the translating device. Its field-winding 15 is connected in shunt across the direct-current mains 9 10. The generator 12 is connected through a shaft 14 with the armature 16 of a differentially-wound motor. This motor has its armature-circuit connected directly across the mains 9 10 at points indicated by the numerals 17 18 and is provided with two field-windings acting in opposition to each other, one of these windings being connected in series with the main 9 and the other in shunt across the mains 9 10. The shunt-winding is indicated in the drawing at 19 and the series winding at 20. Upon increase in load on the direct-current system the current through the series winding 20 of the driving-motor increases, thereby cutting down the resultant field strength of the motor, which thereupon speeds up. The armature electromotive force of the generator 12 driven thereby therefore increases correspondingly, and since the armature is in series with the direct-current circuit the electromotive force produced by the generator 12 is either added to or subtracted from that impressed upon the mains, depending on the manner in which the armature is connected in circuit. It will be obvious to one skilled in the art that by proper adjustment the electromotive force impressed on the mains may be such as to secure an over-compounding effect or to maintain a constant potential at the terminals of the machine, or instead of causing the electromotive force of the generator 12 to be added to the line the machine may be so connected in as to reduce the voltage upon increase of load. In such a case the storage battery 11 assists in supplying current when the load is heavy and is charged at light loads. Either mode of connecting in the generator 12 is within the terms of my invention.

What I claim as new, and desire to secure by Letters Patent of the United States, is—

1. The combination of a source of current, mains extending therefrom, current-consuming apparatus supplied with current from said mains, a generator having its armature in series with one of said mains so that its voltage is combined with that impressed upon the mains, and a motor mechanically coupled to said generator, said motor having a field-winding in shunt to said mains and another field-winding in series with one of said mains.

2. The combination of mains, a source of current-supply therefor, a generator with its armature in series with one of said mains, a motor mechanically connected to said generator, and means for automatically varying the speed of said motor in response to variation of load on said mains.

3. The combination of direct-current mains, an electromotive-force generator connected in series with one of said mains and acting in opposition to current flowing in said main, and means for driving said generator at a variable speed.

4. The combination of direct-current mains, an electromotive-force generator connected in series with one of said mains and acting in opposition to current flowing in said main and means for driving said generator at a speed varying automatically with the load.

5. The combination of direct-current mains, a storage battery connected thereto, an electromotive-force generator connected in opposition in one of said mains, and means for automatically varying the speed of said generator with variation of load.

In witness whereof I have hereunto set my hand this 23d day of April, 1900.

ERNST J. BERG.

Witnesses:
BENJAMIN B. HULL,
ALEX F. MACDONALD.